May 3, 1955

A. BOUWERS ET AL 2,707,417

CATADIOPTRIC OBJECTIVE SYSTEM HAVING
A CEMENTED CORRECTING SURFACE

Filed March 19, 1952

INVENTORS
A. Bouwers
B. S. Blaisse
H. W. Bulthuis
BY Wenderoth, Lind & Ponack
Attorneys

United States Patent Office 2,707,417
Patented May 3, 1955

2,707,417

CATADIOPTRIC OBJECTIVE SYSTEM HAVING A CEMENTED CORRECTING SURFACE

Albert Bouwers, The Hague, Berndt Stephan Blaisse, Voorburg, and Henricus Wilhelmus Bulthuis, The Hague, Netherlands, assignors to N. V. Optische Industrie "De Oude Delft," Delft, Netherlands Application March 19, 1952, Serial No. 277,504

Claims priority, application Netherlands March 22, 1951

10 Claims. (Cl. 88—57)

This invention relates to a catadioptric system comprising a concave mirror. Such systems are known, for example, from United States Patent 2,492,461, registered under the name of one applicant, whilst in United States patent application Serial No. 189,104 dated October 9, 1950, now Patent No. 2,656,761 dated October 27, 1953, also registered under the name of another applicant, new types of such systems are described.

The present invention has for its purpose further to increase the aperture ratio of the systems concerned, which is already considerable.

The aperture ratio of catadioptric systems is often limited by the fact that the correcting element or the correcting refractive surface brings about a considerable spherical over correction of an order higher than the third order for large relative apertures. Since with concave mirrors the spherical aberration of higher orders is very small, it is not possible to compensate the over correction of higher orders of the correcting element.

The applicant has now found means to compensate over correction or under correction of higher orders with the use of a cemented surface, which separates two media with refractive indices differing by at least 0.0001 and at most 0.01 in the wavelength range used, in such a manner that the largest of the angles of incidence on the cemented surface is at least 36°.

The upper limit of 0.01 referred to above is still considerably lower than the refractive index differences usual with cemented surfaces. This is attributable to the cemented surface having to fulfil an unusual function, viz. the correction of aberrations of orders higher than the third order only, whereas with the constructions hitherto known the cemented surfaces must also correct aberrations of the third order and in many cases chromatic aberrations as well.

The cemented surface according to the invention has a small power, but with angles of incidence of 36° and more it brings about under correction for spherical aberration of higher order, which exactly compensates the over correction of higher orders of the system without cemented surface. Consequently, when a cemented surface according to the invention is added to a catadioptric system, the relative aperture may be materially increased.

In order that the invention may be more clearly understood, the underlying idea will now be explained more fully with reference to the accompanying drawing.

Fig. 1 is a graph of two refractive indices $n_1$ and $n_2$ of two transparent materials as a function of the wavelength $\lambda$. The difference in refractive index $\Delta n = n_2 - n_1$ can immediately be read from this graph in the wavelength range limited by wavelengths $\lambda_1$ and $\lambda_2$.

Fig. 2 shows part of a catadioptric system, i. e. the concave mirror $a$ and the cemented surface $b$. The latter separates the media 1 and 2, the refractive indices of which, $n_1$ and $n_2$ respectively, are shown in Fig. 1.

A light ray incident from the left is refracted by the cemented surface $b$ and after being reflected by the concave mirror $a$, passes again through the cemented surface $b$. When passing for the second time, the angles of incidence and refraction are large, so that spherical aberration of higher orders will occur, i. e. under connection, since $n_2$ is larger than $n_1$. It is obvious that the same result is obtained, if the path of the rays is reversed.

If, according to the invention, $\Delta n$ is chosen to be at least 0.0001, the effect is quantitatively of importance. On the other hand, $\Delta n$ must not be chosen to exceed 0.01, since otherwise the under correction would become excessive.

Figure 1:
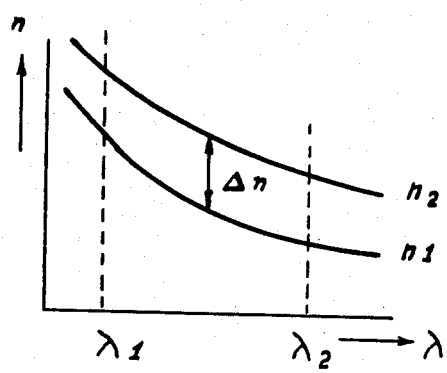
Fig. 1 shows a graph illustrating the invention.
Figure 2:
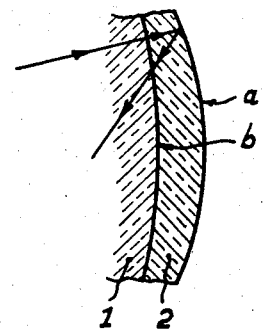
Fig. 2 is a sectional view showing one form of the invention.

In the example shown in Fig. 2, the cemented surface is passed twice. In cases in which the incident ray is at small angles to the optical axis, a cemented surface which is traversed by the rays reflected by the mirror only, is sufficient.

One advantageous embodiment of the system according to the invention is that in which the cemented surface is plane, so that obvious constructional advantages are obtained.

According to the invention, it is furthermore advisable that the cemented surface should be curved in the same sense as the mirror. It is thus ensured that the numerical aperture my be further increased by about 7% in comparison with a plane cemented surface.

In a further embodiment of the system according to the invention, in which use is made of a convex mirror as well, the cemented surface is provided between the concave and the convex mirror, it being traversed three times by the optically active rays.

Figure 3:
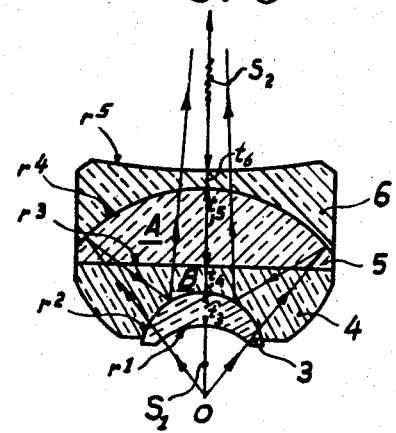
Fig. 3 is a sectional view of microscope objective.

Fig. 3 shows, by way of example, one embodiment of a catadioptric system according to the invention. This embodiment is a microscope objective, the constructional data of which are as follows:

|  | Radius of curvature of lens surface in mm. | Axial thickness and spacing in mm. | $n_r$ | $n_c$ |
|---|---|---|---|---|
| Object O | | $S_1 =$ 6.61 | 1.0 | 1.0 |
| lens 3 | $r^1 =$ 6.61 | $t_3 =$ 3.80 | 1.52607 | 1.51736 |
| lens 4 | $r^2 =$ 5.62 | $t_4 =$ 2.40 | 1.52607 | 1.51736 |
| lens 5 | $r^3 = \infty$ | $t_5 =$ 7.40 | 1.52751 | 1.51881 |
| lens 6 | $r^4 =$ 15.49 | $t_6 =$ 2.30 | 1.52751 | 1.51881 |
| image | $r^5 = 169.82$ | $S_2 = 169.82$ | 1.0 | 1.0 |

The thicknesses and the indices of refraction for the F-line and the C-line of the lens components indicated in the first column are given in the last two columns.

The cemented surface $r^2$ is provided with a central, completely reflecting zone of 2.8 mm. in diameter, surrounded by an annular zone which is reflecting for 50% and which has an outer diameter of 6 mm.

The concave surface $r^4$ is reflecting except for a central opening of 5.6 mm. in diameter.

For the sake of clearness, the table also indicates the object O to be observed and the image, together with their distances from surface $r^1$ and surface $r^5$ respectively.

The cemented surface $r^3$ separates the components 4 and 5, which have a difference in refractive index of 0.00145 for the C-line and of 0.00144 for the F-line. Owing to these differences in refractive index, it is ensured that light rays having wavelengths in the wavelength range used have under correction for the spherical aberration of higher order than the third order in case of large angles of incidence. In the present example, the angle enclosed between the ray AB and the normal in point A of surface $r^3$ is 57°. The focal length of the objective is 4.3 mm. and the numerical aperture is 0.70. If the cemented surface according to the invention were not used, the numerical aperture would have been only 0.58, owing to the resulting over correction for the spherical aberration of higher orders.

Figure 4:
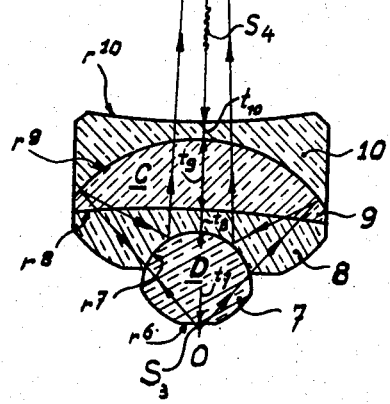
Fig. 4 is a sectional view of a further modification of the invention.

A second embodiment is shown in Fig. 4. The constructional data are indicated in the table below:

| | Radius of curvature of lens surface in mm. | Axial thickness and spacing in mm. | $n_F$ | $n_C$ |
|---|---|---|---|---|
| Object O | | $S_3=6.0$ | 1.0 | 1.0 |
| | $r^6=\infty$ | | | |
| lens 7 | | $t_7=9.2$ | 1.52359 | 1.51547 |
| | $r^7=5.50$ | | | |
| lens 8 | | $t_8=2.1$ | 1.52359 | 1.51547 |
| | $r^8=85.11$ | | | |
| lens 9 | | $t_9=7.1$ | 1.52579 | 1.51764 |
| | $r^9=14.79$ | | | |
| lens 10 | | $t_{10}=1.5$ | 1.52579 | 1.51764 |
| | $r^{10}=162.18$ | | | |
| image | | $S_4=162.18$ | 1.0 | 1.0 |

The cemented surface $r^7$ is provided with a central zone of 2.5 mm. in diameter, which is completely reflecting and which is surrounded by an annular zone which is reflecting for 50% and which has an outer diameter of 5.7 mm.

The concave mirror $r^9$ is reflecting except for a central opening of 5.4 mm. in diameter.

The cemented surface $r^8$ separates components 8 and 9, which have a difference in refractive index of 0.00217 for the C-line and of 0.00220 for the F-line. In this case also, the combination of this difference in refractive index in the wavelength range used with large angle of incidence results in surface $r^8$ having under correction for spherical aberration of higher order than the third order. The angle enclosed between the ray CD and the normal in point C of surface $r^8$ is 66°.

The focal length of this objective is 2.8 mm., and the numerical aperture with cedar-oil immersion is 1.15. Without using the cemented surface according to the invention, the numerical aperture in this case would have been only 0.87.

Owing to the fact that the cemented surface $r^8$ is curved in the same sense as the concave mirror, it is ensured that the numerical aperture is increased more than would have been possible by means of a plane cemented surface.

We claim:

1. A corrected catadioptric objective system of large relative aperture having in optical alignment and axially spaced apart between a short conjugate focus and towards the long conjugate focus of the optical system a plurality of spherical surfaces comprising a first air exposed refracting surface, a second partly reflecting and refracting surface convex toward the long conjugate focus, a third cemented refracting surface, a fourth partly reflecting and refracting surface concave towards the short conjugate focus and towards the cemented surface and the second partly reflecting and refracting surface, and a fifth refracting surface exposed to air, the space between the first air exposed refracting surface and the fifth refracting surface exposed to air being filled with transparent lens material having a refractive index greater than 1, the second partly reflecting and refracting surface having a central reflecting zone which acts as a convex mirror which is curved in the same sense and has a shorter radius of curvature than the fourth partly reflecting and refracting surface concave towards the short conjugate focus and a marginal light transmitting zone, the concave reflecting and refracting fourth surface having a central light transmitting zone and an outer reflecting zone, the relative position of the spaced spherical reflecting surfaces and the refracting surfaces being optically adjusted to focus light rays from the short conjugate focus entering the first refracting surface to emerge from the fifth refracting surface to the long conjugate focus.

2. A corrected catadioptric objective system of large relative aperture having in optical alignment and axially spaced apart between a short conjugate focus and towards the long conjugate focus of the optical system a plurality of spherical surfaces comprising a first air exposed refracting surface, concave towards the short conjugate focus, a second partly reflecting and refracting surface convex toward the long conjugate focus, a third cemented refracting surface, a fourth partly reflecting and refracting surface concave towards the short conjugate focus and towards the cemented surface and the second partly reflecting and refracting surface, and a fifth refracting surface exposed to air and concave towards the long conjugate focus, the space between the first air exposed refracting surface and the fifth refracting surface exposed to air being filled with transparent lens material having a refractive index greater than 1, the second partly reflecting and refracting surface having a central reflecting zone which acts as a convex mirror which is curved in the same sense and has a shorter radius of curvature than the fourth partly reflecting and refracting surface concave towards the short conjugate focus and a marginal light transmitting zone, the concave reflecting and refracting fourth surface having a central light transmitting zone and an outer reflecting zone, the relative position of the spaced spherical reflecting surfaces and the refracting surfaces being optically adjusted to focus light rays from the short conjugate focus entering the first refracting surface to emerge from the fifth refracting surface to the long conjugate focus.

3. A catadioptric system as set forth in claim 1 wherein said cemented surface separates two media having refractive indices which differ in the wavelength range used by at least 0.0001 and at most 0.01.

4. A catadioptric system as claimed in claim 1 wherein the cemented surface is plane.

5. A catadioptric system as claimed in claim 1 wherein the cemented surface is curved.

6. A catadioptric system as claimed in claim 1 wherein said cemented surface is passed three times by the optically active light rays.

7. A catadioptric system as set forth in claim 2 wherein said cemented surface separates two media having refractive indices which differ in the wavelength range used by at least 0.0001 and at most 0.01.

8. A catadioptric system as claimed in claim 2 wherein the cemented surface is plane.

9. A catadioptric system as claimed in claim 2 wherein the cemented surface is curved.

10. A catadioptric system as claimed in claim 2 wherein said cemented surface is passed three times by the optically active light rays.

References Cited in the file of this patent

UNITED STATES PATENTS

| | | |
|---|---|---|
| 1,724,527 | Spierer | Aug. 13, 1929 |
| 2,097,494 | Lihotzky | Nov. 2, 1937 |
| 2,336,379 | Warmisham | Dec. 7, 1943 |
| 2,378,301 | Kaprelian | June 12, 1945 |
| 2,520,635 | Grey | Aug. 29, 1950 |
| 2,576,011 | Grey | Nov. 20, 1951 |
| 2,656,761 | Blaisse | Oct. 27, 1953 |